E. J. VON HENKE.
AUTOMATIC SWITCHING OR CIRCUIT BREAKING DEVICE FOR ELECTRIC WELDING OR OTHER METAL WORKING APPARATUS.
APPLICATION FILED OCT. 8, 1917.
1,267,481.
Patented May 28, 1918.
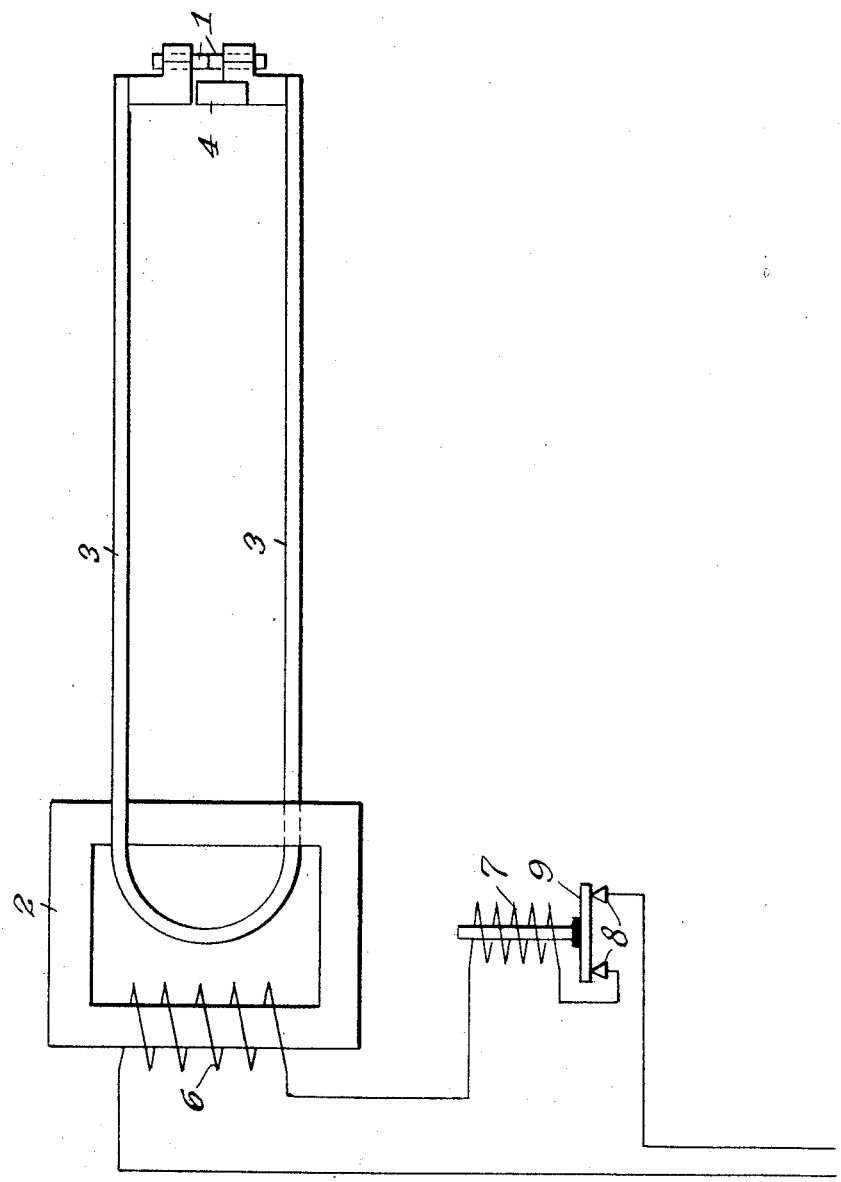
INVENTOR
Edmund J. Von Henke
BY
Townsend & Decker
ATTORNEYS.

UNITED STATES PATENT OFFICE.

EDMUND J. von HENKE, OF LYNN, MASSACHUSETTS, ASSIGNOR TO THOMSON ELECTRIC WELDING COMPANY, OF LYNN, MASSACHUSETTS, A CORPORATION OF MASSACHUSETTS.

AUTOMATIC SWITCHING OR CIRCUIT-BREAKING DEVICE FOR ELECTRIC WELDING OR OTHER METAL-WORKING APPARATUS.

1,267,481.      Specification of Letters Patent.      Patented May 28, 1918.

Application filed October 8, 1917. Serial No. 195,272.

*To all whom it may concern:*

Be it known that I, EDMUND J. VON HENKE, a citizen of the United States, and a resident of Lynn, in the county of Essex and State of Massachusetts, have invented certain new and useful Improvements in Automatic Switching or Circuit-Breaking Devices for Electric Welding or other Metal-Working Apparatus, of which the following is a specification.

My invention relates to that class of electric welding or other metal working apparatus in which a stepdown transformer is employed and the work is supplied with heating current from the secondary thereof.

My invention relates more particularly to automatic switching or circuit breaking devices whereby the flow of heating current in the secondary may be cut off or stopped automatically upon the completion of the work and its object is to avoid the use of connecting wires between the welding or metal working portion of the apparatus and the transformer itself, thereby making it unnecessary to bring the high and dangerous voltage of the primary to the welding apparatus proper as has heretofore been done in previous forms of apparatus wherein the circuit closer or contact device carried by a work-engaging electrode closes the energizing circuit for the switching appliances.

A further object is to avoid the necessity for using a supplemental secondary coil upon the transformer for supplying the active current that energizes the switching devices as has also been before proposed.

By my invention it is possible to secure an entirely automatic operation of the switching appliances without any connecting wires whatever between the welding or metal working part of the apparatus proper and the transformer itself.

Briefly stated, the invention consists in providing the work-engaging terminals of the secondary with a short-circuiting device for short-circuiting the secondary current when the work-engaging electrodes move forward, and utilizing the increased flow of current, thereby resulting as the energizing current for the automatic switch or circuit breaker. This may be conveniently accomplished by employing an electro-magnet interposed in the primary circuit as to be affected by the increased current flowing through the primary under the conditions stated or by otherwise arranging an armature or magnetic actuating device for the switch in the field of some portion of the transformer or circuits thereof so as to be operated by the increase of current produced as above stated.

As my invention, consistently with the principle above stated, may take very many forms and as will be well understood by those skilled in the art, I have illustrated the same in skeleton and diagrammatically by showing merely the principal parts of an electric welding or other metal working apparatus.

1 typifies any work-engaging holders or dies of an electric welding or other metal working apparatus adapted to be moved toward one another to compress the work between them and forming the terminals of the secondary circuit of a transformer typified diagrammatically at 2. Secondary wires, leads or conductors are indicated at 3 as electrically connected to the dies 1 but the manner of mounting said dies or work-engaging electrodes is not specifically illustrated. Associated with and properly mounted to move with said work-engaging electrodes 1, I provide short-circuiting contact 4 properly arranged so that the moment the elecrode or electrodes 1 move forward through the softening of the work included between them, the current will be shunted through the path of comparatively lower resistance than the path through the dies or work-engaging electrodes with the result of producing a corresponding increase of current in the secondary and in the transformer and primary thereof indicated at 6. This increased current I utilize as the actuating current for the circuit breaker in any desired way, as for instance by including in the circuit of the primary an electro-magnet the coils of which are indicated at 7. The contacts of the circuit breaker operated by said magnet and indicated at 8 are normally bridged by the plate 9 held in contact therewith by gravity or by a spring and the circuit of the primary is completed normally through the switch or circuit breaker thus formed. The energizing of the relay results in the breaking of the primary circuit and the cutting off of the welding or other work current supplied to the work-engaging electrodes. Upon the energizing of the relay the circuit breaker may be latched up mechanically or by supplemental magnetic means brought into action by the relay or circuit breaker parts when they move, the circuit breaker being unlatched for the next operation and as well understood in the art.

Obviously the leads or connections from the transformer to the dies or work-engaging electrodes may be of any desired length and the welding or other metal working parts of the apparatus operated and the automatic action secured without dangerous proximity to the primary. This is particularly useful in portable types of apparatus which are constantly in the hands of the operator.

Obviously further, the actuating magnet for the switch or circuit breaker can be fixed in the transformer casing, the only connection between the transformer and the work-engaging electrodes being that of the secondary leads 3.

What I claim as my invention is:—

1. The combination with an electric metal working apparatus of the character described, of means for automatically forming a shunt of the secondary current around the work-engaging electrodes and means energized by the resultant increased flow of current for automatically breaking the primary circuit.

2. In an electric metal working apparatus of the character described, the combination with a secondary circuit for the transformer, of means for closing a short circuit around the work-engaging electrodes supplied by the secondary and an electro-magnetic circuit breaker having its magnet coils in the circuit of the primary and adapted to break the primary circuit by the increased flow of current therein resulting from the operation of the circuit closer connected to the secondary.

3. In an electric metal working apparatus, the combination with work-engaging electrodes, of short-circuiting contacts movable therewith to complete the circuit of the secondary around said work-engaging electrodes as they move in completing the work, a circuit breaker controlling the primary circuit and an actuating magnet therefor energized by the current of the primary as and for the purpose described.

Signed at New York in the county of New York and State of New York this 6th day of October, A. D. 1917.

EDMUND J. von HENKE.

Witnesses:
F. B. TOWNSEND,
IRENE LEFKOWITZ.